United States Patent [19]
Batten

[11] Patent Number: 6,075,864
[45] Date of Patent: Jun. 13, 2000

[54] METHOD OF ESTABLISHING SECURE, DIGITALLY SIGNED COMMUNICATIONS USING AN ENCRYPTION KEY BASED ON A BLOCKING SET CRYPTOSYSTEM

[76] Inventor: Lynn Margaret Batten, c/o 181 Freedman Cres., Winnipeg, Manitoba, Canada, R3T 5V4

[21] Appl. No.: 08/920,893

[22] Filed: Aug. 29, 1997

Related U.S. Application Data

[60] Provisional application No. 60/025,089, Aug. 30, 1996.

[51] Int. Cl.$^7$ ................................ H04K 1/00; H04L 9/00
[52] U.S. Cl. ........................... 380/255; 380/259; 380/268
[58] Field of Search ................................ 380/45, 43, 49, 380/23

[56] References Cited

U.S. PATENT DOCUMENTS

| | | | |
|---|---|---|---|
| 4,306,308 | 12/1981 | Nossen ........................................ | 375/48 |
| 4,733,401 | 3/1988 | Longstaff .................................... | 375/37 |
| 5,465,299 | 11/1995 | Matsumoto et al. ........................ | 380/23 |
| 5,867,578 | 2/1999 | Brickell et al. ............................. | 380/23 |
| 5,903,721 | 4/1999 | Sixtus ................................ | 395/187.01 |

OTHER PUBLICATIONS

S. Ball, "On the Size of a Triple Blocking Set" in PG(2,q), European Journal of Combinatorics, 17, (1996), 427–435 (8 pages).
S. Ball, "Multiple Blocking Sets and Arcs in Finite Planes" preprint (18 pages).
S. Ball and A. Blokhuis, "On the Size of a Double Blocking Set" in PG(2,q), preprint (15 pages).
L.M. Batten, "Combinatorics of Finite Geometries", Cambridge University Press, 1986 (3 pages) BOOK.
L.M. Batten, "Blocking Sets in Designs", Congressus Numerantium, 99 (1994), 139–154 (17 pages).
L. Berardi & F. Eugeni, "Blocking Sets in Affine Planes", J. Geom., 22 (1984), 167–177 (11 pages).
A.E. Brouwer and A. Schrijver, "The Blocking Number of an Affine Space", J. Comb. Theory, 24 (1978), 251–253 (2 pages).
A.A. Bruen and R. Silverman, "Arcs and Blocking Sets II", Europ. J. Comb., 8 (1987), 351–356( 6 pages).
H.m. Gustafson, A.N. Pettitt E.P. Dawson and L.J. O'Connor, "Linear Dependencies in Product Ciphers", Austral. J. Comb., 10 (1994), 115–129 (8 pages).
R.E. Jamison, "Covering Finite Fields with Cosets of Subspaces", J. Comb. Theory (A), 22(1977), 253–266 (8 pages).
R.S. Rees and D.R. Stinson, "Combinatorial Characterizations of Authentication Codes II, Designs, Codes and Cryptography", 7 (1996), 239–259 (11 pages).

(List continued on next page.)

*Primary Examiner*—Gail O. Hayes
*Assistant Examiner*—Anthony DiLorenzo
*Attorney, Agent, or Firm*—Adrian D. Battison; Murray E. Thrift

[57] ABSTRACT

The encryption key based on a blocking set cryptosystem includes knowledge of the blocking set, and ciphers (usually independent) on the blocking set and its complement. In order to decipher, a legitimate receiver needs to know only the blocking set and the cipher used on it. Thus it is not necessary for the sender to transmit to anyone the cipher on the complement of the blocking set. The fact that part of the encryption key need not be transmitted is the fundamental difference between the proposed cryptosystem and the so-called private key system, where both the sender and receiver know, but keep secret, the encryption and decryption keys. Particularly useful applications of this scheme are two situations where a central person, institution or computer send out confidential information to several parties, but where none of the parties has the authority to transmit information to the group. This might apply to the main branch of a company, or to a certification authority in a cryptographic protocol. It can also be used to establish an access hierarchy in a computer or security network.

8 Claims, 1 Drawing Sheet

In the diagram below, P is a plain text message, B a blocking set, σ a cipher on P/B, τ a cipher on B. $e_{(B, \sigma, \tau)}$ is an encryption key based on B, σ and τ, while $d_{(B, \tau)}$ is a decryption key based only on B and τ.

OTHER PUBLICATIONS

G.J. Simmons, "A Cartesian Product Construction for Unconditionally Secure Authentication Codes that Permit Arbitration", J. Cryptology, 2 (1990), 77–104 (15 pages).

D.R. Stinson, "Some Constructions and Bounds for Authentication Codes", J. Cryptology 1 (1988) 37–51 (8 pages).

D.R. Stinson, "A Construction for Authentication/Secrecy Codes from certain Combinatorial Designs", J. Cryptology, 1 (1988), 119–127 (5 pages).

D. R. Stinson, "The Combinatorics of Authentication and Secrecy Codes", J. Cryptology, 2 (1990), 23–49 (14 pages).

D. R. Stinson, "Combinatoial Characterizations of Authenication Codes", J. Cryptology 2, (1990), 175–187 (7 pages).

T. van Trung, "On the Construction of Authentication and Secrecy Codes, Designs, Codes and Cryptology", 5 (1995), 169–280 (7 pages).

M. de Brades and V. Rodl, (1984), "Steiner Triple Systems with Small Maximal Independent Sets" Arc Comb. 17 (1987) 15–19.

A. Bruen "Baer Subplanes and Blocking Sets", Bull. Amer. Math. Soc. 76 (1970), 342–344 (2 pages).

G. B. Dantizig and A.J. Hoffman, "Dilworths Theorem on Partially Ordered Sets' in Linear Inequalities and Related System", Annals of Math Studies No. 38, (Ed. Kuhn and Tucker) (1956), 207–214 (8 pages).

R.P. Dilworth, "A Decomposition Theorem for Partially Ordered Sets" Ann. Math. 51 (1950), 161–165 (4 pages).

E. Sperner, "Ein Satz Uber Untermengen Einer Endlichen Menge", Math. Z. 27 (1928), 544–548 (3 pages).

T. Verhoeff "An Updated Table of Minimum–Distance Bounds for Binary Linear Codes" IEEE Transactions on Information Theory, vol. IT–33 No.: 5 Sep. 1987 (16 pages).

A.A. Bruen and J.A. Thas "Blocking Sets" Geometriae Dedicta 6 (1977) 193–203—(6 pages).

A.A. Bruen, J.A. Thas and A. Blokhuis "On M.D.S. Codes, Arcs in PG(n,q) with q even, and a Solution of Three Fundamental Problems of B. Segre" (Inventiones Mathematicase 92,441–459 (1988)—(10 pages).

S. Innamorath and A. Maturo "The Spectrum of Minimal Blocking Sets" (11 pages).

In the diagram below, P is a plain text message, B a blocking set, σ a cipher on P/B, τ a cipher on B. $e_{(B, \sigma, \tau)}$ is an encryption key based on B, σ and τ, while $d_{(B, \tau)}$ is a decryption key based only on B and τ.

METHOD OF ESTABLISHING SECURE, DIGITALLY SIGNED COMMUNICATIONS USING AN ENCRYPTION KEY BASED ON A BLOCKING SET CRYPTOSYSTEM

This application claims the benefit under 35USC119 of the filing date of Provisional Application Serial No. 60/025,089 filed Aug. 30, 1996.

This invention relates to a method of encryption and decryption of information in the form of a set of messages in which the encryption is effected at a transmission site and the decryption is effected at a receiving site. The method allows the transmission site to create a signature which can be subsequently determined from the message for authenticating the source.

BACKGROUND OF THE INVENTION

The integrity of communication has two components. One is the maintenance of privacy or confidentiality of the message or information being communicated; the other is the ability to authenticate the source of the message. The former of these is discussed hereinafter. Here we mention some of the methods which have been used to verify the message source in private key systems.

One of the simplest ways of authenticating the source is for the sender and receiver to prearrange a short list of valid messages, with the understanding that any alteration to one of these would indicate that an interception has taken place or a false message has been sent. A variation on this is to pre-determine the message structure and only accept as authentic those messages which fit this structure. Where authentication of the source is particularly important under the above arrangement, arbitration can be introduced to determine, usually in probabilistic terms, the level of certainty with which a message can be connected to its source. For comprehensive and clear expositions on authentication and arbitration, the reader is referred to (20) and (21). For recent work on codes supplying both secrecy and authentication, see (18), (21)–(25) and (27).

'Signing' a message is a particular kind of authentication method. A person's name or digital 'fingerprint' are examples of a signature. If a signature is incorporated as part of the message being sent, it is as vulnerable to change by an opponent as any other part of the message. In contradiction to this perception, we present in this patent application a protocol for a secure private key system with signature.

We mention finally that many signature schemes have been based on 'data compression' or 'hashing' eg. (19), reducing the message to a miniature version of itself, which then essentially plays the role of the signature.

The following prior art disclosed information in the general field of the present invention but one discloses information which is material to the present invention.

(1) S. Ball, On the size of a triple blocking set in PG(2,q), European Journal of Combinatorics, 17 (1996), 427–435.

(2) S. Ball, Multiple blocking sets and arcs in finite planes, preprint.

(3) S. Ball and A. Blokhuis, On the size of a double blocking set in PG(2,q), preprint.

(4) L. M. Batten, Combinatorics of Finite Geometries, Cambridge University Press, 1986.

(5) L. M. Batten, Blocking sets in designs, Congressus Numerantium, 99 (1994), 139–154

(6) H. Beker and F. C. Piper, Cipher Systems: The Protection of Communications, John Wiley & Son, 1982.

(7) L. Berardi and F. Eugeni, Blocking sets in affine planes, J. Geom., 22 (1984), 167–177

(8) Th. Beth, D. Jungnickel and H. Lenz, Design Theory, Bibliographisches Institut, Zurich, 1985.

(9) A. E. Brouwer and A. Schrijver, The blocking number of an affine space, J. Comb. Theory, 24 (1978), 251–253

(10) A. A. Bruen and R. Silverman, Arcs and blocking sets II, Europ. J. Comb., 8 (1987), 351–356.

(11) C. Delany, COMPLETE—Rationale and User's guide, Technical Report, CCR-01-95, Centre for Combinatorics, University of Queensland, 1995.

(12) H. m. Gustafson, A. N. Pettitt, E. P. Dawson and L. J. O'Connor, Linear dependencies in product ciphers, Austral. J. Comb., 10 (1994), 115–129.

(13) J. W. P. Hirschfeld, Projective Geometries over Finite Fields, Clarendon Press, Oxford, 1979.

(14) R. E. Jamison, Covering finite fields with cosets of subspaces, J. Comb. Theory (A), 22 (1977) 253–266.

(15) A. Menezes, Elliptic Curve Public Key Cryptosystems, Kluwer Academic Press, 1993.

(16) A. Nijenhuis and H. S. Wilf, Combinatorial Algorithms. 2nd ed'n., Academic Press, 1978.

(17) C. Ramsay, An improved version of COMPLETE for $\lambda=1$, Technical Report, CCR-03-96, Centre for Combinatorics, University of Queensland, 1996.

(18) R. S. Rees and D. R. Stinson, Combinatorial characterizations of authentication codes II, Designs, Codes and Cryptography, 7 (1996), 239–259.

(19) B. Schneier, Applied Cryptography, John Wiley & Son, 1994.

(20) J. Seberry and J. Pieprzyk, Cryptography: An Introduction to Computer Security, Prentice Hall, 1989.

(21) G. J. Simmons, A cartesian product construction for unconditionally secure authentication codes that permit arbitration, J. Cryptology, 2 (1990), 77–104.

(22) D. R. Stinson, Some constructions and bounds for authentication codes, J. Cryptology 1 (1988). 37–51

(23) D. R. Stinson, A construction for authentication/secrecy codes from certain combinatorial designs, J. Cryptology, 1 (1988), 119–127.

(24) D. R. Stinson, The combinatorics of authenticationand secrecy codes, J. Cryptology, 2 (1990), 23–49.

(25) D. R. Stinson, Combinatorial characterizations of authentication codes, J. Cryptology, 2 (1990), 175–187.

(26) D. R. Stinson, Cryptography: Theory and Practice, CRC Press, 1995.

(27) T. van Trung, On the construction of authentication and secrecy codes, Designs, Codes and Cryptology, 5 (1995), 269–280.

(28) H. S. Wilf, Combinatorial Algorithms: An Update, SIAM, 1989.

(29) I. Anderson, Combinatorics of Finite Sets, Oxford Science Publications.

(30) M. De Brandes and V. Rodl, (1984), 'Steiner Triple Systems with small maximal independent sets' Ars Comb. 17 (1987) 15–19.

(31) A. Bruen 'Baer subplanes and blocking sets', Bull. Amer. Math. Soc. 76 (1970), 342–344

(32) G. B. Dantizig and A. J. Hoffman, 'Dilworth's theorem on partially ordered sets' in Linear Inequalities and Related Systems, Annals of Math Studies no. 38, (Ed. Kuhn and Tucker) (1956), 207–214.

(33) R. P. Dilworth, 'A decomposition theorem for partially ordered sets'. Ann. Math. 51 (1950), 161–165.

(34) K. Phelps and V. Rodl, "Steiner Triple Systems with minimum independence number". Ars Comb. 21 (1986) 167–172.

(35) V. Pless, Introduction to the theory of error-correcting codes, John Wiley and Sons, New York, Toronto, 1982.

(36) E. Sperner, 'Ein Satz Uber Untermengen einer endlichen Menge.' Math. Z. 27 (1928), 544–548.

Some of the above prior art documents are variously mentioned in the following description of the present invention where they are defined by the relevant reference numeral, as for example [21]. Where so mentioned, the disclosure of the defined prior art document is incorporated into this description by reference.

SUMMARY OF THE INVENTION

It is one object of the present invention to provide a method of encryption and decryption of information for a transmission which allows the transmission site to create a signature.

According to the invention therefore, there is provided a method of transmitting information between authorized sites including a transmission site and a receiving site such that the information is secure from non-authorized sites comprising:

providing to the authorized sites a set of messages which can be transmitted between the sites, each message being a string of bits in identifiable positions, and each message being allocated an agreed meaning;

communicating to the authorized sites information identifying for the set of messages selected positions of the bits so that others of the positions of the bits are not selected, the selection of positions being arranged to allow determination of a unique message from the messages set by analysis of the bits in said selected positions;

providing to the authorized sites a secrete encryption key and a corresponding secret decryption key such that the secrete encryption key is known to said transmission site and the corresponding decryption key is known to said receiving site;

providing to said transmission site a second encryption key different from said secret encryption key;

selecting from the set of messages a subset of messages to be transmitted;

at the transmission site encrypting for the subset of messages, using said private encryption key, only the bits at the selected positions;

at the transmission site encrypting for the subset of messages, using said second encryption key, the bits at the not selected positions;

transmitting the encrypted subset of messages from the transmission site;

at the receiving site for each message of the subset decrypting the message using the decryption key to decrypt the bits at said selected positions;

at the receiving site for each message of the subset analyzing the decrypted bits at said positions to determine each message from the set of messages;

and providing a signature of the transmitting site by comparing, for at least some messages, the encrypted bits at the not selected positions with the bits at the not selected positions from the set of messages.

The selected bit positions are chosen from a determining set of a matrix of the set of messages.

In one method of operation, the transmission site transmits insufficient messages using the second encryption key to allow the receiving site to determine the second encryption key and wherein the second encryption key is provided to a trusted authority for subsequent comparison of the signature with the second encryption key to prove the signature of the transmission site.

In another method of operation, the transmission site transmits sufficient messages using the second encryption key to allow the receiving site to determine the second encryption key and thus to provide said signature.

Preferably there is a plurality of transmission sites each having its own unique second encryption key and wherein all the second encryption keys are known only to the respective transmission site and to a trusted authority.

Preferably the second encryption key is not transmitted and hence supplies the system with a high degree of security.

Preferably the second encryption key is arranged to introduce randomness to the encrypted message.

Preferably the selected positions are arranged to provide error detection and correction.

Figure 1:
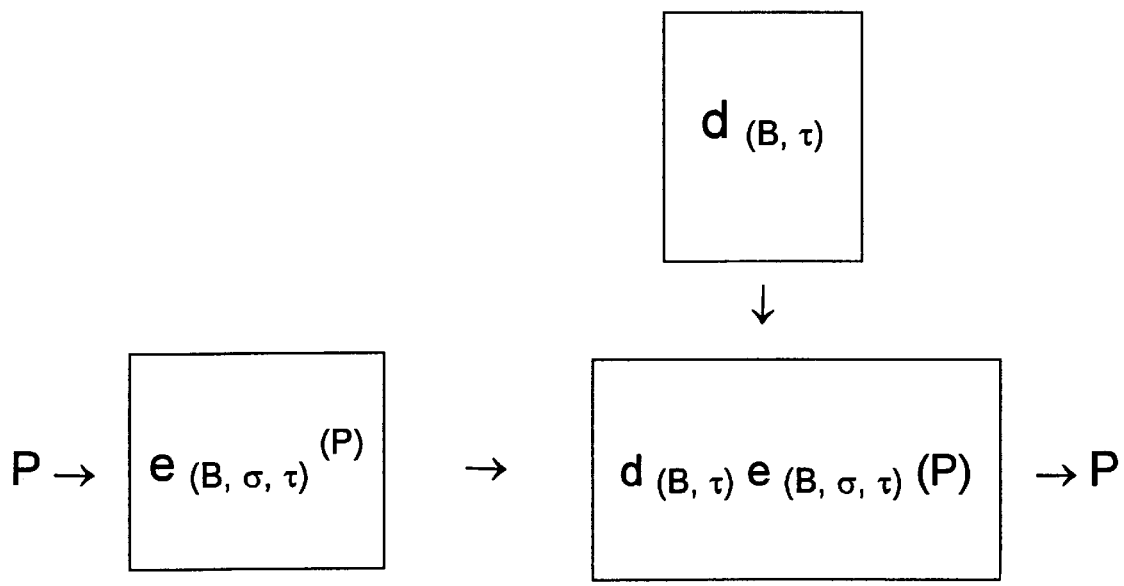
FIG. 1 is a schematic illustration of one embodiment of the method according to the present invention.

In general, and as explained in more detail in the embodiments set out hereinafter and so shown in FIG. 1, the method includes firstly the step of providing to the various authorized sties a set of messages, which may or may not be secret, in which each message is defined by a string of information bits arranged in identifiable positions of the message. The messages are distinct and each is allocated an individual meaning which is agreed between the parties. A party wishing to transmit can generate a complete message formed from a subset of the messages with each message comprising a string of information bits. The complete message set defines a matrix in which the messages are arranged in a horizontal column so that the information bits are arranged in aligned vertical columns of identifiable positions. The messages may or may not have the same number of information bits.

The next step involves the communication between the parties of a cipher which is defined by an agreed number of selected ones of the identifiable positions or columns from the matrix. The selection of the positions is arranged relative to the whole message set so that each message can be determined from the information bits only at the selected positions without reference to the information at the other positions which are not selected. In order to provide a sufficient number of positions and the location of the positions, the selection of the positions is effected using the principles of determining or blocking sets as set out in detail hereinafter so that the positions are selected from a blocking set or determining set of the above matrix.

The method further includes the step of providing to the transmission site and to the receiving site the necessary encryption and corresponding decryption keys which allow the messages to be encrypted and decrypted for transmission. The keys are normally secret with the intention that unauthorized parties cannot determine the content of the messages from the encrypted transmitted information bits.

The transmission site chooses or is allocated a second encryption key different from the main encryption key above. This second encryption key is intended as the signature which will identify the transmission site and therefore this second encryption key is normally kept secrete except that it is generally provided to a trusted authority to enable the signature to be authenticated.

The transmission site than acts to encrypt the information bits at the selected positions of the message using the primary encryption key. The information bits at the non-selected positions are encrypted using the second encryption key. The messages so fully encrypted are then transmitted to the receiving site for decryption.

The receiving site acts to decrypt the messages only of the information bits at the selected positions and, as stated above, these positions have been selected so that the receiving site can analyze the information at these positions and can determine from those positions the intended message.

However the receiving site also receives the information bits at the non-selected positions which are encrypted using the second encryption key.

In some cases the transmission site may choose to send, in the complete message, sufficient information in the non-selected positions to the receiving site to allow the receiving site to determine the signature by a comparison of the transmitted information and the known information from the message. In this case the receiving site can confirm the source since the messages contain the necessary signature.

In an alternative arrangement, the signature is provided to a trusted authority and insufficient information is communicated from the transmission site to the receiving site to allow the receiving site to determine the signature from the messages. In this case, should any doubt arise in regard to the message, an audit will authenticate the source.

This system is ideal for use in a scenario in which all participants can decrypt everything and the identity of one or more of the participants remains secret from all but a trusted authority.

This arrangement can be used in a system of bidding by internet in which each bidder registers with the trusted authority (auctioneer) by submitting a signature. The signatures are kept secret from the other parties. The cipher, which is an identification of the selected positions, is sent by the auctioneer to all of the registered bidders. Each bidder sends in a bid using the cipher and using the registered signature to the auctioneer who then passes on the bid to all participants.

This system can also be used for voting by the internet in which the trusted authority comprises a scrutineer. This allows the participants to check that the correct number of votes has been made and the participants can identify their own vote while being unable to identify the votes of others. The fact that the participants cannot determine the votes of the others prevents pressures from other participants rendering the voting system a secret ballot arrangement.

The system can also be used for internet branch bank networks in which there is a main branch, through which all transactions must run, and several area branches. The system thus allows each area branch to provide its signature which authenticates each message transmitted with that signature being known only to the main branch.

Further details of the method are explained in the following examples.

DETAILED DESCRIPTION

We present a new protocol for a private key cryptosystem based on d-blocking sets, $d \geq 2$, in t-designs. Although for $\lambda > 1$, adjustments can be made in terms of the frequency distribution of the alphabet used, and equivalence classes set up, in the interest of simplicity, we shall assume throughout that $\lambda = 1$.

Unlike the majority of private key cryptosystems, this system permits the message sender to 'sign' the message, and also allows the receiver to detect and correct errors made in transmission. In addition, the system provides a high level of security while remaining easy to encipher and decipher.

To this point in the prior art, the terms 'symmetric' and 'private key' have been used interchangeably. Quoting from Schneier [19, pg. 3]: There are two general forms of key-based algorithms: symmetric and public key. Symmetric algorithms are algorithms where the encryption key can be calculated from the decryption key and vice versa. The algorithm we present here is not symmetric in this sense, through it is private key. Knowing the decryption key does not allow encryption. In order to encrypt, an extra key is needed, which is kept secret from all parties, but which when revealed through an encryption/decryption procedure, plays the role of a signature.

A t-design $S = S_\lambda(t, k; v)$ is a finite system of v elements, called points, and b elements called blocks, each of which is a set of k points such that any set of t points determines precisely $\lambda$ blocks where t, $\lambda \geq 1$. (See [8] for instance.)

A d-blocking set, $d \geq 1$, in a t-design is a subset of the point-set which is met by every block in at least d points.

A cryptosystem is a five-tuple (P, C, K, E, D) ([26]) in which the following conditions hold:

1. P is a finite set of plaintexts.
2. C is a finite set of ciphertexts.
3. K, the keyspace, is a finite set of keys.
4. For each $k \epsilon K$ there is an encryption rule $e_k \epsilon E$ and a corresponding decryption rule $d_k \epsilon D$. Each $e_k : P \to C$ and $d_k : E(P) \to P$ are functions such that $d_k(e_k(x)) = x$ for all $x \epsilon P$.

In describing the protocol, we shall use d-blocking sets in a fundamental way to define the encryption and decryption rules. As we shall need $d \geq t$, and since for $d > 1$ the only thorough work for d-blocking sets has been done in PG(2, q) ([1]–[3]), we outline the system based on the design PG(2, q), for an arbitrary prime power q. However, the construction of the system is completely valid for all t-designs, $t \geq 2$, with $\lambda = 1$. (As noted in the preliminary remarks, adjustments can be made for $\lambda > 1$.)

We must define P, C, K and the functions $e_k$ and $d_k$.

Let $\Pi = PG(2, q)$ for fixed prime power q, and let I be any incident matrix of $\Pi$ ([4]) with points corresponding to columns and lines to rows.

The set $P_0$ will be the set of $(q^2+q+1)$-tuples corresponding to the rows of I. We shall all $P_0$ the primary plaintext set. The (full) plaintext set P and the ciphertext set C will both be $Z_2^{q^2+q+1}$, all $(q^2+q+1)$-tuples over GF(2).

$P_0$ will contain the plaintext with which we identify the character set used in compiling the message. If this character set is based on the roman alphabet, choosing q=5 gives enough room to incorporate the standard teletypewriter characters in standard or binary form (see [6], Appendix 2). A larger value of q could be used to accommodate the different frequency distributions of the various characters. In any event, for cryptanalytic purposes, we assume throughout that frequency distributions of the underlying character set are adjusted at the outset in the identification with elements of $P_0$, and that each element of $P_0$ is therefore chosen with equal probability in any message based on $P_0$.

The set of keys will be all triples (B, ρ, σ) where B is a d-blocking set in $\Pi$, $d \geq 2$, ρ is a cipher on |B|-tuples over GF(2) and σ is a cipher on |Π\B|-tuples over GF(2). We assume, in addition, that σ provides perfect L-fold secrecy on the tuples corresponding to Π\B, but not (L+1)-fold secrecy, for some L≧1. (See [23] and [24].)

For x∈P and k∈K, $e_k(x)$ is the element of C obtained by applying ρ to the |B| components of x corresponding to B in the order in which they appear in I, and by applying σ to the |Π\B| components of x corresponding to Π\B.

Using PG(2, 4) and the incidence matrix I below. We also use the same 2-blocking set in each example, B={1, 2, 4, 5, 6, 10, 11, 12, 13, 15, 16, 20} where the points are labelled 1 through 21. B has twelve elements, the smallest number possible in a 2-blocking set in PG(2, 4) [3], and so it consumes a large portion of the whole plane. Fortunately, as q increases, finding 'relatively small' 2-blocking set in Π is easier.

The incidence matrix I.

|  | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| $l_1$ |  |  | 1 | 1 |  |  |  |  |  | 1 |  | 1 |  |  |  |  |  |  |  |  | 1 |
| $l_2$ | 1 |  |  | 1 | 1 |  |  |  |  | 1 | 1 |  |  |  |  |  |  |  |  |  |  |
| $l_3$ |  | 1 |  |  | 1 | 1 |  |  |  | 1 |  |  | 1 |  |  |  |  |  |  |  |  |
| $l_4$ |  | 1 |  |  | 1 | 1 |  |  |  |  | 1 |  | 1 |  |  |  |  |  |  |  |  |
| $l_5$ |  |  |  | 1 |  |  | 1 | 1 |  |  |  |  | 1 |  | 1 |  |  |  |  |  |  |
| $l_6$ |  |  |  |  | 1 |  | 1 | 1 |  |  |  |  |  | 1 |  | 1 |  |  |  |  |  |
| $l_7$ |  |  |  |  |  | 1 |  | 1 | 1 |  |  |  |  |  | 1 |  | 1 |  |  |  |  |
| $l_8$ |  |  |  |  |  |  | 1 |  | 1 | 1 |  |  |  |  |  | 1 |  | 1 |  |  |  |
| $l_9$ |  |  |  |  |  |  |  | 1 |  | 1 | 1 |  |  |  |  |  | 1 |  | 1 |  |  |
| $l_{10}$ |  |  |  |  |  |  |  |  |  | 1 |  | 1 | 1 |  |  |  |  | 1 |  | 1 |  |
| $l_{11}$ |  |  |  |  |  |  |  |  | 1 |  | 1 | 1 |  |  |  |  |  |  | 1 |  | 1 |
| $l_{12}$ | 1 |  |  |  |  |  |  |  |  |  |  | 1 |  | 1 | 1 |  |  |  |  | 1 |  |
| $l_{13}$ |  | 1 |  |  |  |  |  |  |  |  |  |  | 1 |  | 1 | 1 |  |  |  |  | 1 |
| $l_{14}$ | 1 |  | 1 |  |  |  |  |  |  |  |  |  |  | 1 |  |  | 1 | 1 |  |  |  |
| $l_{15}$ |  | 1 |  | 1 |  |  |  |  |  |  |  |  |  |  | 1 |  |  | 1 | 1 |  |  |
| $l_{16}$ |  |  | 1 |  | 1 |  |  |  |  |  |  |  |  |  |  | 1 |  |  | 1 | 1 |  |
| $l_{17}$ |  |  |  | 1 |  | 1 |  |  |  |  |  |  |  |  |  |  | 1 |  |  | 1 | 1 |
| $l_{18}$ |  |  |  |  | 1 |  | 1 |  |  |  |  |  |  |  |  |  |  | 1 |  | 1 | 1 |
| $l_{19}$ | 1 |  |  |  |  | 1 |  | 1 |  |  |  |  |  |  |  |  |  |  | 1 | 1 | 1 |
| $l_{20}$ | 1 | 1 |  |  |  |  | 1 |  | 1 |  |  |  |  |  |  |  |  |  |  | 1 |  |
| $l_{21}$ |  | 1 | 1 |  |  |  | 1 |  | 1 |  |  |  |  |  |  |  |  |  |  |  |  |

Before defining the inverse operation, we take a moment to discuss the secrecy arrangements concerning the key. Both the transmitter and the receiver of the message will agree on B and ρ which will both be kept secret from other parties. The transmitter may choose B and the receiver ρ, or vice-versa, or one participant could choose both B and ρ. The transmitter chooses σ and keeps it secret. (It will be the signature.)

In order to compute the 'inverse' of y in C, a participant knowing both B and ρ calculates as follows: to the components of y corresponding to B, apply $ρ^{-1}$. Call the element of C obtained, $y^{ρ^{-1}}$. Choose any pair of 1's in $y^{ρ^{-1}}$ in positions corresponding to B, In $P_0$, do a search for elements with these 1's in exactly the same positions. The set of all elements of $P_0$ computed this way is defined to be $d_k(y)$. In general, $d_k(y)$ has ≧0 elements. However, if y∈K($P_0$)—that is, y is the image of an element of $P_0$ via some key k—then $d_k(y)$ is a singleton set precisely because any two points of Π determine a unique line and because B is a d-blocking set in Π, d≧1. (Note that each pair of 1's will yield the same element of $P_0$!) Thus if $P_0$ is the set on which the message character set is based, a participant knowing B and ρ can reconstruct the message.

Since σ is not used in deciphering, a natural question to ask is, can someone who knows B and ρ determine σ? Recall that σ provides L-fold, but not (L+1)-fold, secrecy. Thus the transmitter can allow the receiver to computer σ by transmitting L+1≦$q^2$+q+1 different encoded elements of $P_0$. Under normal circumstances, a transmitter would agree to 'sign' a message this way. Upon receipt of a message, the receiver should compute the signature, and request the transmitters, over a possibly insecure channel, to verify that a message was indeed sent with that particular signature.

The matrix I is public knowledge, while B is known only to the transmitter and receiver. The receiver now chooses the following permutation of the elements, of B, ρ=(1, 15) (2, 6, 11, 10) (5, 13, 20, 16) (4) (12), and sends it via a secure channel to the transmitter. The transmitter chooses the following permutation of Π\B, σ=(3, 21) (7, 14, 9, 19, 17, 8, 18), and keeps it secret. The key used for encryption is k=(B, ρ, σ). Any element of the full alphabet P can be encrypted using k. However, normally (but see section 8) the message will be constructed based on $P_0$. Thus $e_k(l_{16})$=(100000100000100010001)=$y_{16}$. To compute $d_k(y_{16})$, the receiver knows only B and ρ. Thus $Y_{16}^{ρ^{-1}}$=(00 - 010 - - - 0000 - 10 - - - 0 -). The 1's in positions 5 and 15 are now located in the same row of I, which produces $l_{16}$ as the inverse of $Y_{16}$.

For the same k, consider encryption of a 21-tuple not in $P_0$: $e_k$(110100111001000001111)=y=(001101100001011111100). Then $y^{ρ^{-1}}$=(11 - 100 - - - 0010 - 00 - - - 1 -). In this case, $d_k(y)$={$l_2, l_{10}, l_{12}, l_{13}, l_{15}, l_{17}, l_{20} l_{21}$}. It will be of interest in the error correction section to note the frequency with which each of these lines occurs. Line $l_2$ arises from three pairs of points, while each other line arises from precisely one pair.

Any enciphered message based on $P_0$ using permutations ρ and σ will be comprised of ($q^2$+q+1)-tuples with precisely q+1 1's. It will be clear to an opponent that most likely a permutation ρoσ was applied. As is well known, a permutation cipher is vulnerable to a known plaintext attach [26]. Later we discuss a 'padding of data' method designed to thwart cryptanalysis of the system.

Hereinafter, we discuss (Lemma 3) just how much information a participant who knows B and ρ needs in order to determine σ in this example. It is significantly fewer than all plaintext/ciphertext pairs. We use the matrix I and 2-blocking set B of the as described above. Since ρ is to be transmitted securely, it is preferable to keep its size small. In addition, for decryption, since the receiver has the size of B, the use of a Vigenère Cipher ([26] with keyword length a divisor of |B| would be appropriate. (If B and ρ are being transmitted via separate channels, the cipher length need not be a function of B. It could simply be truncated or repeated when applied to B, as necessary. This would then reveal nothing about the size of B to an interceptor of ρ.)

As σ is not transmitted, a one-time pad [26] can be used. It is applied by the transmitter to all entries of the matrix I corresponding to the points of Π\B, line by line.

We use $\rho=(010010011100)$ and σ a random stream of $189(=|\Pi\backslash B|\cdot(q^2+q+1))$ bits. If the first 9 of these bits are: 111011000, then $e_k(l_1)=(010101111011111010001)$. To decrypt, the receiver identifies those components corresponding to B, applies $\rho^{-1}$ and proceeds as in the example above.

In this example, encryption does not preserve the number of 0's and 1's appearing in the plaintext element, and so is clearly not based on a permutation. Moreover, as q gets larger, the choice of a relatively small d-blocking set results in a large amount of randomness in the enciphering and so decreases chances of cryptanalysis by an interceptor.

In order to obtain σ, the receiver needs to know all plaintext/ciphertext pairs, unlike in the previous example.

The application of the two ciphers in this instance, can be viewed as a product cipher ([6], [26]).

As mentioned in the pre-amble, an important method of ensuring secrecy is to have a large keyspace on which to draw. In this section, we therefore examine the theory of d-blocking sets, $d\geq 2$, in PG(2, q). This work is very recent, and quite specific to PG(2, q), and therefore usable to some extent also in AG(2, q). To this point, no similar theory exists for other designs.

the following four theorems can be found in [1]–[3]. We suppose $d\geq 1$. Note that a d-blocking set if also (d–i)-blocking for all $0\leq i\leq d-1$.

Theorem 1

Let B be a d-blocking set in PG(2, q). If B contains no line, then it has at least $dq+\sqrt{dq}+1$ points.

Theorem 2

Let B be a d-blocking set in PG(2, p), p>3 prime.

(a) If $d<p/2$, then $|B|\geq(d+1/2)(p+1)$.

(b) If $d>p/2$, then $|B|\geq(d+1)p$.

Theorem 3

Let B be a 2-blocking set in PG(2, q).

(a) If q<9, then B has at least 3q points, (b) If q=11, 13, 17 or 19, then $|B|\geq(5q+7)/2$.

(c) If $19<q=p^{2d+1}$, then $|B|\geq 2q+p^d(p^{d+1}+1)+2$.

(d) If 4<q is a square, then $|B|\geq 2q+2\sqrt{q}+2$.

Theorem 4

Let B be a 3-blocking set in PG(2, q).

(a) If q=5, 7 or 9, then $|B|\geq 4q$, and if q=8, then $|B|\geq 31$.

(b) If q=11, 13 or 17, then $|B|\geq(7q+9)/2$.

(c) If $17<q=p^{2d+1}$, then $|B|\geq 3q+p^d(p^{d+1}+1)/(p^d+1)+3$.

(d) If 4<q is an even square, or q=25, 49, 81 or 121, then $|B|\geq 3q+2\sqrt{q}+3$.

(e) If 121<q is an odd square, then $|B|\geq 3q+3\sqrt{q}+3$.

In the square order case with d=2, Gall and Blokhuis show [3] that equality is reached by taking the union of two disjoint Baer subplanes. (See [4] or [8] for the definition.) In any projective plane, Desarguesian or not, a set of three lines not all on a common point (a triangle) forms a 2-blocking set on 3q points. Clearly, any superset of either of these examples is again a 2-blocking set, so that 'shapes' of 2-blocking sets can be quite varied.

Since the sets of points which correspond to lines play a special role in this cryptosystem, it is useful to have large numbers of 2-blocking sets available which contain no or very few lines. In this vein, we present the next two results.

For distinct points p and r of a projective plane, pr represents the unique line on p and r.

Lemma 1

Let B be a 2-blocking set in an arbitrary projective plane Π of order q such that B contains a unique line of Π. Then $|B|\geq 2q+\sqrt{q}+2$, and, if Π is Desarguesian, $|B|\geq 3q$. Moreover, if $q\geq 5$, there exist 2-blocking sets in Π containing a unique line of Π for all $3q\leq|B|\leq q^2-q+2$.

Proof

We first of all show the bounds.

Let l be in the unique line of Π contained in B. Then B\l is a blocking set in the classical sense, of the affine plane A=Π\l. By Bruen and Silverman [10], $|B\backslash l|\geq q+\sqrt{q}+1$ for $q\geq 3$. Morover, Jamison [14] and Brouwer and Schrijver [9] proved that in case Π, and so also A, is Desarguesian, then $|B\backslash l|\geq 2q-1$. It follows that $|B|\geq 2q+\sqrt{q}+2$, and in case Π is Desarguesian $|B|\geq 3q$.

Now suppose that Π is an arbitrary projective plane of order $q\geq 5$. Berardi and Eugeni [7] construct the following blocking set in A=Π\l, l any line of Π.

Fix points $p_0$, $p_1$, $p_2$, $p_3$ and lines $l_1=p_0p_1$, $l_2=p_0p_2$, $l_3=p_0p_3$, $l_4=p_2p_3$, $l_5=p_1p_3$, $l_6=p_1p_2$ such that $l_1\|l_4$ and $l_2\|l_5$. Fix a point $p\in l_6\backslash\{l_3\cap l_6, p_1, p_2\}$. (Note that $l_3\cap l_6$ may be empty.) Then $B_0=(l_1\cup l_2\cup\{p, p_3\})\backslash\{p_1, p_2\}$ is a blocking set in A on 2q–1 points, since $q\geq 5$.

Now fix a line $l_7\|l_1$, $l_7\neq l_1$, $l_4$, and not on p or $l_3\cap l_6$. Take a point $r\in p_3p_4\backslash\{p_3,p_4\}$ where $p_4=l_2\cap l_7$, and such that r, $p_2$ and $l_5\cap l_7$ are not collinear. Define $X_0=A\backslash(l_1\cup l_2\cup l_5\cup l_7\cup\{p, r\})$. Thus $(B_0\cup X_0)^3=B_0^3\cap X_0^3=l_5\backslash\{p_3\}\cup l_7\backslash\{p_4\}\cup\{p_2, r\}$ with order 2q–1, and so $|B_0\cup X_0|=(q-1)^2$. In addition $B_0\cup Z_0$ is again a blocking set in A. Finally, let X be any subset of $X_0$. It is easy to see that, $B_0\cup X$ is still a blocking set and that as X varies, it takes on all sizes in the range $[2q-1, (q-1)^2]$. Thus $B=B_0\cup X\cup l$ is a 2-blocking set in Π with a unique line, taking on all sizes in the range claimed. □

Lemma 2

Let Π be a projective plane of order $q\geq 5$. Then there exist 2-blocking sets B for all $3q\leq|B|\leq(q-1)^2+3$ which contain no line of Π.

Proof

Consider the three points a, b, c of a triangle in Π, and choose $p\in ab\backslash\{a, b\}$, $h\in ac\backslash\{a, c\}$, $r\in bc\backslash\{b, c\}$, $r\notin ph$, and points $y\in ph\backslash\{p, h\}$, $y\notin bc$, $z\in pr\backslash\{p, r\}$, $z\notin ac$, $w\in hr\backslash\{h, r\}$, $w\notin ab$ and such that $w\notin yz$. (All of this is possible if $q\geq 4$.) If $q\geq 5$, the set $B_0=(ab\cup bc\cup ac\cup\{y, z, w\})\backslash\{p, h, r\}$ is a 2-blocking set containing no full line of Π. Moreover, $|B_0|=3q$. We now define a set X by its complement in Π:

$$X^c\backslash hp\backslash\{y\}\cup pr\backslash\{z\}\cup hr\backslash\{w\}.$$

y, z and w are not collinear, $X^c$, and so also X, is a blocking set in Π. Moreover, $B_0\subseteq X$ which has order $(q-1)^2+3$. It follows that X is a 2-blocking set in Π which contains no line of Π. In fact, for any choice of $X_0$ such that $B_0\subseteq X_0\subseteq X$, $X_0$ is also a 2-blocking set containing no line of Π. We therefore have the required sets in Π of all orders in the range claimed. □

Corollary

If $q\geq 5$, we can allow y, z and w above to be collinear and still have a 2-blocking set on no line of Π.

Similar results are not difficult to give for t>2. For instance, in any projective plane, four lines, no three on a common point, along with the point of intersection of their 'diagonals', for a 3-blocking set.

An exact count of all possible 2-blocking sets in PG(2, q), is difficult. For those containing triangles, there are $(q^2+q+1)(q^2+q)q^2/6$ choices for the triangle, B, and then adjoin any subset X of II\B.

For q=4, there are 1120 triangles, 1120×9 2-blocking sets of 3q+1 points which contain a triangle, and so on. Lemmas 1 and 2 above give a sense of the number of 2-blocking sets available which do not contain a triangle.

As we mentioned in the example above, it is not necessary to have all plain-text/ciphertext pairs in order to calculate σ in case σ is a permutation. The next lemma describes a sufficient set of pairs which is much smaller.

Lemma 3. The permutation σ can be determined by anyone who knows both x and $e_k(x)$ for all x in the dual of a 2-blocking set in II\B.

Proof. In the dual of a 2-blocking set, every point is on at least two lines. Take any point p and let p be on distinct lines $x_1$ and $x_2$. The permutation σ moves the corresponding 1's in I to the column σ(p) of I which is the unique position in which both $e_k(x_1)$ and $e_k(x_2)$ have a common 1. □ As described above we saw that 2-blocking sets of size approximately 3q and larger are available in PG(2, q). If q=11 and we take a fixed 2-blocking set on approximately half the points, this gives a key space size of about $2^{66}$. This is the decryption keyspace size. The signature keyspace size would be at least the same. For q=13, these keyspace sizes move up to $2^{91}$. Thus, to ensure against an exhaustive key attack, enlarging q is an obvious and simple route. In practice, the number of decryption keys available is $$\sum_{i=m}^{q^2+q+1} 2^i$$

where m is the minimum size of a d-blocking set. This number does not take into account the fact that there can be many different blocking sets of the same size.

An additional component of this particular algorithm, is that an opponent who does not know the blocking set chosen can simply ignore it and launch an attack on ρ∘σ. This, for q=11, means considering a key size of $2^{133}$ or more. (An example as above using a one-time pad would increase this number significantly.)

In order to consider the strength of the algorithm, we shall consider the formal concepts of perfect secrecy and unicity distance for a specific instance of the algorithm. We choose to consider the case where ρ and σ are both permutations and B is any triangle in II=PG(2, q). As was pointed out in section 3, ρ∘σ applied to $P_0$ will result in $(q^2+q+1)$-tuples with precisely q+1 1's. We let $C_0$ be the set of all such tuples.

A cryptosystem has perfect secrecy if p(x|y)=p(x) for all x∈P and y∈C. That is, the probability that given y, the plaintext is x, is the same as the probability of choosing x at random from P.

In reality, our alphabet is $P_0$ and so we shall work with this as our plaintext set in what follows. We show first of all that every element of $C_0$ is in $K(P_0)$, the set of images of $P_0$ under the key space K={(B,ρ,σ)|B a triangle in II, ρ and σ appropriately-sized permutations}.

Lemma 4. Let q≧8. For all x∈$P_0$ and y∈$C_0$, there exists k∈K such that y=$e_k(x)$. Moreover, if y=$e_{(b,\rho,\omega)}(x)$ and |y∩B|=d, then there are precisely $d!(3q-d)!(q+1-d)!(q^2-3q+d)!$ choices of pairs (ρ', σ') for which y=$e_{(B,\rho',\sigma')}(x)$.

Proof. Note the following obvious, but important, point. If $y_1$ and $y_2$ are elements of C and B is a triangle in II such that $|y_1 \cap B|=|y_2 \cap B|$, then there exist ρ and σ such that $e_{(B,\rho,\sigma)}(y_1)=y_2$.

In order to prove the first statement of the theorem, it therefore suffices to prove that given any x∈P and y∈C, there is a triangle B in II such that $|x \cap B|=|y \cap B|$.

We shall refer to a line of II meeting a set of points X of II in a single point as a tangent to X.

For y∈C, we consider y to be a set of q+1 points in II.

case (i). Suppose that not all tangents to points of y meet in a common point.

Let $l_1, l_2$ and $l_3$ be tangents to y at distinct points of y, such that $a=l_1 \cap l_2$, $b=l_2 \cap l_3$ and $c=l_1 \cap l_3$ are not collinear. If x goes through no three of these points, then $B=l_1 \cup l_2 \cup l_3$ meets x and y in precisely three points, and the remark at the outset of the proof completes the argument.

Suppose that x is on a but on neither b nor c. If there is a line l not on a missing y, then letting $B=l \cup l_1 \cup l_2$, $|x \cap B|=2=|y \cap B|$. So assume that every line not on a meets y. Thus at least $q^2+2$ lines meet y. There are at most $$\binom{q+1}{2}$$

lines meeting y in at least two points. Therefore there must be at least $$q^2+2-\frac{q(q+1)}{2}=(q^2-q+4)/2$$

tangents to y. If no point of y is on at least four tangents, the total number of tangents can be at most $3(q+1) \geq (q^2-q+4)/2$, implying q≦7, and a contradiction. If no second point of y is on at least two tangents, we obtain $q+q \geq (q^2-q+4)/2$, implying q≦4, again a contradiction. Therefore we may choose points u, v and w of y such that each is respectively on at least 1, 2 and 4 tangents to y. Let $l_u$ be a tangent on u meeting x in a. Let $l_v$ be a tangent on v meeting x in b≠a. Let $l_w$ be a tangent on w meeting x in c≠a or b, and not on $l_u \cap l_v$. Then $B=l_u \cup l_v \cup l_w$ meets both x and y in three points.

Now suppose x=ab. If the point a is only on tangents to y, choose l'$_1$ on a, not equal to $l_1$. Then l'$_1 \cap l_2$=a, l'$_1 \cap l_3$=b'≠b, b' not on x, and $l_2 \cap l_3$=c still. Now the previous situation where x is on a unique point of the set {a, b', c} can be applied. Therefore, suppose that not all lines on a are tangent to y, whence it follows that some line l on a misses y altogether. Now $B=l \cup l_2 \cup l_3$ meets x and y in two points.

case (ii). Suppose that all tangents to y meet in a common point c.

Then c is not in y itself, and is only to tangents to y, so that each point of y is on a unique tangent and y forms an oval [13]. The number of lines of II missing y is therefore precisely $$q^2+q+1-\binom{q+1}{2}-(q+1)=(q^2-q)/2.$$

Since q>4, we obtain $q+2<(q^2-q)/2$ in which case, some point of x is on at least two lines, $l_1$ and $l_2$, exterior to x and not equal to x. Let $l_3$ be any line meeting y in two points, $l_3 \neq x$, $l_1 \cap l_2 \notin l_3$. (There are many choices for $l_3$). Then $B=l_1 \cup l_2 \cup l_3$ meets both x and y in just two points.

To see that the second claim of the theorem is true, it is sufficient to note that in the 3q positions corresponding to B, the d 1's appearing in y can be permuted arbitrarily amongst themselves, as can the 3q–d 0's. Similary for II\B. □

It is a natural question now to ask for the frequency with which each element of $C_0$ occurs. This question is difficult to answer as it is tied in with the relative structure of a line in II with respect to a random set of q+1 points. Even in the highly symmetric case where y takes on the structure of an oval, as in the last part of the previous proof, the structure of y relative to a line and triangle of II can vary considerably (see [13]). For the very special case where y is a line, i.e., y∈$P_0$, we are, however, able to compute the number of (encryption) keys which will generate y, as is shown below.

Lemma 5. (a) If y∈$P_0$, then the number of (encryption) keys k such that $y=e_k(y)$ is $$2\binom{q+1}{2}q^2(q-1)(3q-2)!(q-1)!(q^2-3q+2)! +$$
$$2(q^2+q)q^2(q-1)^2(3q-3)!(q-2)!(q^2-3q+3)! +$$
$$q^2\binom{q+1}{2}(q+1)!(2q-1)!(q^2-2q-1)!$$

(b) If x, y∈$P_0$, x≠y, then the number of keys k such that $y=e_k(x)$ is $q(q-1)^2(2q-3)(3q-2)!(q-1)!(q^2-3q+2)!+q^2(q-1)^2(2q^2-5q+5)(3q-3)!(q-2)!(q^2-3q+3)!+q^2(q+1)!(2q-1)!(q^2-2q-1)!$ Proof. The number of triangles intersecting a line y in precisely two points is $$\binom{q+1}{2}q^2(q-1).$$

The number intersecting y in precisely three points is $(q^2+q)q^2(q-1)^2/3$. The number intersecting y in precisely q+1 points is $$q^2\binom{q+1}{2}.$$

The total number of keys can then be computed using lemma 4. This gives part (a). A similar argument yields (b). □

Let M be the $|P_0|\times|K|$ matrix with columns corresponding to points of $P_0$ and rows corresponding to elements of K, and such that the entry corresponding to x∈$P_0$ and k∈K is $y=e_k(x)\in C_0$. This matrix is the basis for evaluating p(x|y) for x∈$P_0$, y∈$C_0$ because of the following formula which can be found in [26]:

$$p(x|y) = \frac{p(x)\sum_{x=d_k(y)}^{k} p(k)}{\sum_{\substack{x,k \\ y=c_k(x)}} p(k)p(d_k(y))}. \quad (*)$$

We shall make the assumption that x and k are chosen at random, and so $$p(x) = \frac{1}{|P_0|} \text{ and } p(k) = \frac{1}{|K|}.$$

Since $p(d_k(y))=p(d_k(e_k(\overline{x})))=p(\overline{x})$, this is again $$\frac{1}{|P_0|}.$$

It remains then, in computing (*), to determine, given fixed x and y, the number of keys k such that $x=d_k(y)$ and the number of pairs (x̄, k) such that $y=e_k(\overline{x})$. The former of these simply counts the number of appearances of y in the column of M corresponding to x. The latter counts the sum of such appearances over all columns, and hence is the total number of times y occurs in M.

The fact that, if y is a line it appears many times with every triangle (see Lemma 5) indicates that its probability as evaluated (*) will be a 'worst case scenario'. In fact, we obtain the following.

Lemma 6. If y is a line, then for 'large' q, $$p(y|y) \approx \frac{1}{3}.$$

If x is also a line, x≠y, then for 'large' q, $$p(x|y) \approx \frac{2}{3}p(y).$$

Proof. Let U be the number of keys for which $y=e_k(y)$, and let V be the number of keys for which $y=e_k(x)$, x≠y (which is constant for all x≠y by lemma 5). By the remarks above, $$p(y|y) = \frac{U}{(q^2+q)V+U} \text{ and } p(x|y) = \frac{V}{(q^2+q)V+U}.$$

The dominant term in U is $$\frac{q^2(q^2+q)}{2}(q+1)!(2q-1)!(q^2-2q-1)!$$

and in V is $q^2(q+1)!(2q-1)!(q^2-2q-1)!$, so we restrict ourselves to these terms, assuming q 'large'. In the first case, the quotient is approximately ⅓ and in the second, approximately $$\frac{2}{3(q^2+q)}, \text{ or } \frac{2}{3}p(y). □$$

The 'anomaly' displayed in the last result with respect to y∈$P_0$ occurs because triangles contain full lines. It is conjectured that this anomaly disappears when the set of all 2-blocking sets is used.

A natural question to ask with respect to the security of a cryptosystem is, assuming that the same key is used for encryption, can the possession of sufficient ciphertext allow for a ciphertext attack? The concept of unicity distance is one way of dealing with this question ([26]); it denotes the average amount of cipher-text required for an opponent to be able to uniquely compute the key given sufficient computing time. An estimate for this value is given in [26] by:

$$n_0 \approx \frac{\log_2|K|}{R_L\log_2|P|},$$

where $R_L$ is the redundancy of the language L on which the plaintext is based. As indicated also in [26], if L is the English language and the system is the Substitution Cipher, $R_L \approx 0.75$ and $n_0 \approx 25$. For $q=11$ in our system, the value of $n_0$ is approximately 126, using $R_L=0.75$; for $q=13$, $n_0$ is approximately 178. Assuming that $R_L$ is constant, we show that $n_0$ goes to infinity as $q$ does in the next result.

Lemma 7. Assume $R_L$ is constant. The $n_0 \to \infty$ as $q \to \infty$.

Proof. We show that given any constant t, there is a q sufficiently large to make $$\frac{\log_2 |K|}{\log_2 |P_0|} > t.$$

It is enough to show that $$\frac{\log_2[(q^2+q+1)(q^2+q)q^2(3q)!]}{\log_2(q^2+q+1)} =$$

$$1 + \frac{\log_2(q^2+q)}{\log_2(q^2+q+1)} + \frac{\log_2 q^2}{\log_2(q^2+q+1)} + \frac{\log_2(3q)!}{\log_2(q^2+q+1)} >$$

$$\frac{\log_2(3q)!}{\log_2(q^2+q+1)} > \frac{\log_2(3q)!}{\log_2(2q^2)} > t.$$

Choosing $q=t^t$ gives $(3q)! > (2q^2)^t$ which implies that the above is true. □

Considering the above results, it is clear that using the set of all 2-blocking sets in II will produce greater security. Note that the result of Lemma 7 remains valid in this case. Moreover, if we replace $P_0$ by P and $C_0$ by C in Lemma 4, the same proof, appropriately adjusted, shows that for every x in P and y in C there exist many $k \in K$ with $y=e_k(x)$.

The cryptanalyst who knows that a d-blocking set cipher has been used, and who has knowledge of the matrix I, knows that any intercepted ciphertext must decode to one of the $q^2q+1$ elements of $P_0$. If $\rho \circ \sigma$ is clearly a permutation, then all q+1 1's in any column of I map to 1's in some other fixed column in the ciphertext. Using this fact makes the cryptanalyst's job easier when reversing this procedure. This idea will still be of assistance if only one of $\rho$, $\sigma$ is a permutation.

If the column structure can be altered completely, then the cryptanalyst is forced back to the full matrix. This can be done by choosing $\sigma$, for example, to be a one-time pad as in section 4, and defining $\rho$ of an entry in I corresponding to an element of B to be the sum modulo 2 of that entry and the next in the same row corresponding to the next element of B. (Here we assume that an ordered listing of the elements of B is available, and that the element 'next to' the last one is the first element of B.) Thus, taking the matrix I and blocking set B of the examples of sections 3 and 4, and using only the 12-tuples corresponding to B, $\rho(001000100000)=$ (011001100000) and $\rho(101101010000)=(110111110001)$. This map hides the fact that point 4 is on both $l_1$ and $l_2$.

In order to prevent the cryptanalyst from using any known statistical analysis of the system, the ciphertext must appear to be random or unpredictable [6]. Thus when choosing $\rho$ and $\sigma$, it is important that the resultant ciphertext have this property. Later we look at ways this might be achieved.

Once a message is enciphered, it should be possible to send it to a receiver over insecure channels with confidence that anyone who has access to large quantities of ciphertext will not be able to decipher it. Thus the ciphertext should be immune to statistical attacks based on underlying dependencies. (See for instance [12]). In other words, it should appear to be random. (It is useful to note the warnings on random number and sequence generation given in [19].)

In attempting to introduce randomness and balance to the ciphertext (—a function is balanced if, when all input vectors are equally likely, then all output vectors are equally likely—), the transmitter has complete flexibility with $\sigma$, but less so with $\rho$ which must be 'relatively small' for secret transmission purposes.

One approach for choosing $\sigma$ is a follows. Choose B and $\rho$ and apply $\rho$ to the columns of I corresponding to B to obtain $I^p$, in which the other entries are left blank. To $I^p$, apply an algorithm similar to COMPLETE ([11], [17]) which will generate (as closely as possible) a design on the $(q^2+q+1) \times (q^2+q+1)$ entries, retaining the incidences in $I^p$. Call this new matrix $I^*$. Hence $I^*$ is a 'randomly' generated, balanced ciphertext set. Take $\sigma$ to be the one-time pad corresponding to the line by line entries of $I^*$ for II\B, as in the example of section 4. The result gives a sense of 'balance' in that both the plaintext matrix I and the ciphertext matrix $I^*$ resemble a design. There are a number of general algorithms available, on the other hand, to complete $I^p$ to a matrix $I^*$ without $I^*$ necessarily taking on the aspect of a design. See for instance [16], [28].

'Padding' enciphered plaintext is a commonly used method both in secrecy and error-correction. We describe how it might be used in this situation:

Let $\rho$ be a permutation and $|B|=t$. We shall think of $\rho$ as a permutation in $S_{q^2+q+1}$, fixing those elements of II\B. The transmitter compiles a plaintext message n bitstrings in length, each bitstring being a $(q^2+q+1)$-tuple. Let $n=sq+r$, $0 \leq r < q$. The transmitter then groups the plaintext into s sets, $P_1, P_2, \ldots P_s$, each containing q plaintext bitstrings, and one set, $P_{s+1}$, containing r plaintext bitstrings, and proceeds to construct s+1 sets, $E_1, E_2, \ldots E_s$ which will each contain t bitstrings of length $q^2+q+1$: for $x_j \in P_i$, $\Theta$ will be a map taking $x_j$ to the $\rho(j)$ position in $E_i$ such that in the components corresponding to B, $\Theta(x_j)$ and $\rho(x_j)$ coincide. In the next stage, several additional bitstrings will be set up in an $(s+2)^{nd}$ set, $E_{s+2}$, thus reducing the chances of an interceptor determining t. Finally, the transmitter then 'randomly' fills the remaining spaces in the $E_i$, $1 \leq i \leq s+2$, with 0's and 1's so that the overall message has the appearance of being random.

To decipher, the receiver, who knows t, recreates the $E_i$, $1 \leq i \leq s+1$, and discards $E_{s+2}$. Then $\rho^{-1}$ is applied to determine the sets $P_i$, $1 \leq i \leq s+1$, and applied again to B, to enable decipherment, discarding any 'garbage' appearing at the end as a result of $0 \leq r < q$.

In this case, the signature $\sigma$ is taken to be the one-time pad as in example 4, however, here, the same element of plaintext appearing in the message twice could result in different versions of $\sigma$. We choose that resulting from the first appearance of the enciphered plaintext string.

The fact that the primary alphabet comes from the lines of a projective plane allows for excellent error detection capability.

Consider the example above. Let $x=(0011000010100000000001)$ corresponding to $l_1$. Using $\rho$, $\sigma$ and B of section 4, we have $e_k(x)=$ (0101011110111110100001). Suppose that three errors in transmission occur, in the 7'th, 10'th and 20'th positions, so that $y^*=(0101010111111110100011)$. The receiver, on obtaining $y^*$, applies $\rho^{-1}$ to obtain (00-100---1100-00---1-). Checking pairs of 1's against I, this decodes to $\{l_1, l_2, l_8, l_{12}, l_{17}, l_{21}\}$. Since each line in this set appears with equal frequency, it is not possible to choose a 'most likely' candidate for x. Note that x and B have precisely the points 4 and 11 in common, while two other elements of B were altered. A non-unique solution thus indicates that at least one error has occurred.

The larger the intersection of B with $x \in P_0$, the higher the chance of error detection and correction. If B is a 3-blocking set and x contains precisely three points of b, one error converting a 1 to a 0 will still result in correct deciphering, while one error converting to 0 to a 1 will likely indicate the correct solution, except in the case where the 'new' 1 gives the same 'decode' line with each of the old ones. In this case, two possible decipherments each occur three times. The chances of this last situation diminish as d increases. With d=4 and one error converting a 0 to a 1, the four 'correct'1's will produce the same decipherment six times whereas the 'new' 1 can decipher with an 'old' 1 to the same line at most four times.

Errors in II\B do not affect deciphering, but do of course, affect the recovery of the signature. If σ is L-fold but not (L+1)-fold secret, then several sets of L+1 plaintext/ciphertext pairs can be checked and the 'most likely' σ chosen.

The protocol described here allows for a high level of security from several different points of view. Randomness is available via the cipher σ and via the padding technique described herein. The size of the cipher ρ is relatively small, as 2-blocking sets are available of size approximately 3q. Thus transmitting (B, ρ) over a secure line is manageable. In the special case that ρ is a permutation, it is not necessary to transmit B separately. For instance, as in the example above, listing ρ as indicated there gives B as well as ρ.

Key management for n users can be simplified because of the three component aspects of the key. For instance, the same blocking set can be used by all members in the group and each person chooses their own σ. Then pairwise agreements on ρ can be reached. Alternatively, all users could use the same ρ, choose their own σ, and agree in pairs on B.

Increasing the alphabet size in this system is a simple operation: just choose a larger prime power q. It is therefore an easy matter to have an alphabet including TEX's approximately 300 primitive control sequences (q=19), or Plain-TEX's approximately 900 sequences (q=31).

Clearly, our bitstring size is always odd, while computer hardware is designed to work with powers of two or multiples of eight etc. A simple adjustment can be made by extending the bitstring length from $q^2+q+1$ to whatever length is desired by the addition of sufficient binary digits. These would be ignored by the receiver in deciphering.

Further axamples will be described hereinafter, some parts of which may repeat steps of the method as described above.

Let Q be a non-empty set of elements which we shall call points. Let B be a non-empty set of subsets of P which we shall call blocks. We consider the use of S=(P, B) in a message sending scenario in the sense that elements of B will be thought of as messages (on the point set P) relayed from one person or station to another. The set P need not necessarily be finite, but finiteness will be assumed in some of what follows.

EXAMPLE 1

Let P={1, 2, 3, 4, 5, 6, }, B={{1, 2, 3, 5, }, {2, 4}, {1, 3, 6}}. If A decides to send {1, 2, 3, 5} to B as a message, A may instead send the subset {5} or the subset {2, 3} for instance, and B can easily establish that {1, 2, 3, 5} was intended. (This is because {1, 2, 3, 5} is the unique block in the message set containing the sets {5} and {2, 3}.)

Notice that if a set of blocks contains two blocks one of which is a subset of the other, then no subset of the smaller block uniquely determines that block. However, if no block in B is a subset of any other, each block has at least one subset which uniquely determines it—simply take the full block.

The above motivates the following definitions.

The triple (P, B, C) is called a critical system if P is a non-empty set of elements called points, B a non-empty set of subsets of P called blocks and C a non-empty set of subsets of P called critical sets such that each block contains at least one critical set and each critical set is contained in a unique block.

Returning to the message sending scenario, one could ask, why not just use the full block as a message. There are two principal reasons. First of all, in a very large (finite) system, a great deal of space can be saved by transmitting only a small portion of each block. Secondly, as we shall see in the final section of this paper, in a cryptologic setting it is useful to have several choices of critical sets for each block.

As described hereinafter, we consider critical systems from the point of view of antichains. Section 3 gives recursive constructions for critical systems. The connection between critical systems and blocking sets is facilitated in section 4 by the introduction of determining sets. We completely classify determining sets in Steiner Triple Systems (Theorems 1 and 2). Finally, we consider applications of determining sets in cryptology and the implications of these for the resulting theory.

An antichain in a poset (L, ~) with relation ~ is a subset of the elements of L, no two of which are related [1]. When L is the set of all subsets of a fixed point set P, ordered by inclusion, for any antichain B the triple (P, B, B) is a critical system. Conversely, given a critical system (P, B, C), choose a subset of C' of C such that each block has a unique critical set in C'. Then C' is clearly an antichain.

The following well-known result of E. Sperner gives an upper bound on the number of blocks forming an antichain on a fixed point set.

Sperner (1928) [36] Let A be an antichain of subsets of a v-set P. Then $$|A| \leq \binom{v}{\left[\frac{v}{2}\right]}.$$

Moreover, the case of equality occurs precisely when each block has size $$\left[\frac{v}{2}\right].$$

$$\left(\text{Here } \left[\frac{v}{2}\right] \text{ for } v \text{ odd is w.l.o.g. either} \frac{v-1}{2} \text{ or} \frac{v+1}{2}.\right)$$

EXAMPLE 2

Let $V_4$ be the set of all 4-tuples over GF(2). Then by Sperner's theorem, any antichain has size at most $\binom{4}{2}=6$; moreover the following set is the unique antichain of maximum size: {(1, 1, 0, 0), (1, 0, 1, 0), (1, 0, 0, 1), (0, 1, 1, 0), (0, 1, 0, 1), (0, 0, 1, 1)}. Clearly, any set of vectors each having a fixed number of 1's also forms an antichain.

The construction of maximal antichains having vectors with different numbers of 1's has been of interest to a number of people. In particular, it may be required that a certain given set of vectors (blocks) appears in the maximal antichain. Many of the algorithms used in the constructions of antichains are based on the following theorem due to Dilworth.

Dilworth (1950) [28]. In any poset P, the maximum size of an antichain is equal to the minimum number of chains in a chain decomposition of P.

Dantzig and Hoffman [32] then use a linear programming approach to find chain decompositions in finite posets. Anderson [29] gives further information on, and references to, antichains.

Note that any t-design with $\lambda=1$ forms a critical system where the points and blocks are the same in each system and the critical sets are the t-subsets. Thus each block of size k contains $\binom{k}{t}$ minimal critical sets.

We first of all give the obvious direct product construction of critical systems on finite point sets.

We shall consider a block of a critical system as the corresponding row in a fixed incidence matrix for the system.

For $S_i=(P_i, B_i, C_i)$, $1 \leq i \leq n$, a critical system on $v_i$ points, define $\Pi_{i=1}^n B_i$ (respectively $\Pi_{i=1}^n C_i$) as $\{(a_1^1, a_2^1, \ldots a_{v_1}^1, a_1^2, a_2^2, \ldots a_{v_2}^2, \ldots a_1^n, a_2^n, \ldots a_{v_n}^n)|(a_1^i, a_2^i, \ldots a_{v_i}^i) \in B_i$ (respectively $C_i$)$\}$.

The following lemma is then easy.

Lemma 1. If $S_i=(P_i, B_i, C_i)$, $1 \leq i \leq n$, is a critical system on $v_i$ points and $b_i$ blocks, where the point sets are considered to be disjoint, then $$\prod_{i=1}^n S_i = \left( \bigcup_{i=1}^n P_i, \prod B_i, \prod C_i \right)$$

is a critical system on $\Pi_{i=1}^n v_i$ points and $\Pi_{i=1}^n b_i$ blocks.

An advantage of this direct product construction is that it increases the number of (minimal) critical sets per block. A second advantage is that the size of maximal antichains remains relatively large (see the gluing construction below for a comparison), with a maximum possible size of $$\prod_{i=1}^n \binom{v_i}{\left[\frac{v_i}{2}\right]}.$$

A second construction, common in coding theory (see [9] for instance) is the idea of 'gluing'. We again identify each block of a finite critical system with the corresponding row in a fixed incidence matrix for the system. Let A and B be two v×b such incidence matrices. Define $$G_0 = \begin{pmatrix} A & 0 \\ 0 & B \end{pmatrix} \text{ and } G_1 = \begin{pmatrix} A & I \\ I & B \end{pmatrix}.$$

The next lemma is immediate.

Lemma 2. $G_0$ and $G_1$ are the incidence matrices of distinct critical systems on 2v points and 2b blocks.

Note that the '0' and '1' operations can be repeatedly applied, resulting in matrices such as $$((G_0)_1)_1 = \begin{pmatrix} AO & I & | & & & & & \\ OB & & | & & & I & & \\ I & AO & | & & & & & \\ & OB & | & & & & & \\ - & - & - & - & - & - & - & - \\ & & | & AO & & & & \\ & & | & OB & I & & & \\ I & & | & & & AO & & \\ & & | & I & & OB & & \end{pmatrix}$$

In comparison with the direct product construction, we note that a block in $G_0$ or $G_1$ has the same number of critical sets as the corresponding block in A or B. Moreover, the maximal possible antichain size in $G_0$ or $G_1$ is $$2 \binom{v}{\left[\frac{v}{2}\right]}.$$

Let $S=(P, B, C)$ be a critical system. Take one critical set $C_i$ for each block. If no $C_i$ is the empty set, then $D = \cup C_i$ forms a 1-blocking set in the sense of Ball and Blokhuis [3], that is, each block meets D in at least one point. If, in addition, no block is contained in D, then D is a blocking set in the sense of Bruen [31].

We note that a 1-blocking set need not necessarily give rise to a family of critical sets in a natural way. This is exhibited by the following example.

EXAMPLE 3

Let B=$\{\{1, 2, 3\}, \{2, 3, 6, 8\}, \{4, 5, 6\}, \{4, 7, 8\}\}$ be the blocks of a system on the eight points 1, 2, ... 8. Then X=$\{2, 3, 4\}$ is a blocking set. Each point, 2, 3, 4, is on two blocks. The pair $\{2, 3\}$ is in two blocks. No other non-empty subset of X occurs in any block. Thus X cannot determine critical sets for the blocks in B.

This leads us to the following definition and lemma.

Definition. Let P be a non-empty set of elements and B a non-empty set of subsets of P. Let D be a subset of P with the property that $D \cap B_i \neq D \cap B_j$ for all distinct elements $B_i$, $B_j$ of B. Then D is called a determining set for the pair (P, B). (It follows that at most one subset of B misses D.)

Lemma 3. Let (P, B, C) be a critical system and for each $B_i \in B$ choose $C_i \in C$ with $C_i \subseteq B_i$. Then (P, B) has determining set $\cup C_i$.

Proof. Let $D = \cup C_i$. Suppose that for some $B_i \neq B_j$ we have $D \cap B_i = D \cap B_j$. Since $C_i \subseteq D \cap B_i = D \cap B_j$, it follows that $C_i \subseteq B_i \cap B_j$ which contradicts the fact that each critical set is contained in a unique block. Therefore $D \cap B_i \neq D \cap B_j$ for $B_i \neq B_j$ and so D is a determining set.

That the converse is false can be seen by examining example 1. The set D=$\{2, 3\}$ is easily checked to be a determining set. The block intersections with D are $\{2, 3\}$ $\{2\}$ and $\{3\}$. These clearly cannot constitute a set of critical sets.

EXAMPLE 4

In the Fano plane, any set of four points including a line forms a determining set. In any projective plane of order q>2, the points of a triangle of lines, without the points of intersection, form a determining set.

In the determining set D of the Fano plane of example 4, three points of D are on a unique tangent while the fourth point is on no tangent. In the following lemma, we consider Steiner triple systems in general (of which the Fano plane is one), in which no point of D is on a tangent.

Lemma 4. Let S by a Steiner triple system and D a determining set of S with the property that no point of D is on a tangent. Then D is the complement of the empty set, a single point, or a line of S. Moreover, every such complement is a determining set with no tangents.

Proof. Let x and y be distinct points in S\D. If the block xy on x and y meets D, then the point of intersection with D is on a tangent. Thus xy⊆S\D. Since S\D contains at most one block, the result follows. The final statement is clear.

A k-arc K in a Steiner triple system S is a set of k points in S, no three on a common block. K is called a skew k-arc if no two blocks determined by points of K intersect in S\K. De Brandes, Phelps and Rödl [30, 34] have thoroughly investigates k-arcs in Steiner triple systems.

We proceed to a complete classification of determining sets in Steiner triple systems. Theorems 1 and 2 below are separated into the cases where S\D contains no block and where it contains a unique block.

THEOREM 1. Let D be a determining set in a Steiner triple system S on v points such that S\D contains no block. Then there is a non-negative integer w such that S\D is a skew w-arc. Moreover, the number of tangents to D is precisely $w(w-1)/2$, and $v \geq w(w+1)/2$. In addition, if each point of D is on a (unique) tangent, then $|D|=w(w-1)/2$ and $v=w(w+1)/2$.

Conversely, if S is a Steiner triple system on v points and W is a skew w-arc in S, then D=S\W is a determining set with precisely $w(w-1)/2$ tangents, $v \geq w(w+1)/2$ and S\D contains no block.

Proof. Let D be a determining set as described in the theorem, and put $|D|=d$, $|S\setminus D|=w\geq 0$. Clearly, S\D is a skew w-arc. It follows that the number of tangents to D is $w(w-1)/2$. Thus $d \geq w(w-1)/2$, with equality when each point of D is on a unique tangent and $v=d+w=w(w+1)/2$.

Now let S be a Steiner triple system on v points with skew w-arc W. Clearly, D=S\W is a determining set with precisely $w(w-1)/2$ tangents. Hence, $|D|\geq w(w-1)/2$, and $v \geq w+w(w-1)/2=w(w+1)/2$.

THEOREM 2. Let D be a determining set in a Steiner triple system S on v points such that S\D contains a unique block l. Then there is a positive integer $w\geq 2$ such that $(S\setminus(D\cup l))\cup\{x\}$ is a skew (w−2)-arc for each point x of l. Moreover, the number of tangents to D is precisely $(w+4)(w-3)/2$, and $v \geq (w^2+3w-12)/2$. If each point of D is on a unique tangent, then $d=(w+4)(w-3)/2$ and $v=(w^2+3w-12)/2$.

Conversely, if S is a Steiner triple system on v points and W is a set of w points of S containing a single block l such that W\{x, y} is a skew (w−2)-arc for all pairs of points {x, y} on l, then D=S\W is a determining set with precisely $(w+4)(w-3)/2$ tangents, $v \geq (w^2+3w-12)/2$, and a single exterior line.

Proof. Let D be a determining set as described in the theorem, and put $|D|=d$, $|S\setminus D|=w$. Clearly $(S\setminus(D\cup l))\cup\{x\}$ is a skew (w−2)-arc for each point x of l. It follows that the number of tangents to D is $$\binom{w-3}{2}+3(w-3)=(w+4)(w-3)/2.$$

Thus $d \geq (w+4)(w-3)/2$, and consequently $v=d+w \geq (w^2+3w-12)/2$. Obviously, equality occurs when each point of D is on precisely one tangent.

Conversely, let S be a Steiner triple system on v points with W as in the theorem. Clearly, D=S\W is a determining set with precisely one exterior line, and the number of tangents as indicated.

The question of the existence of skew k-arcs in Steiner triple systems must now be raised. For $k\leq 3$, these always exist in non-trivial Steiner triple systems. A skew 4-arc is anti-Fano in the sense that none of the diagonals of the quandrangle intersect. In the Steiner triple systems S=PG(n, 2), $n\geq 3$, we can always build skew (n+2)-arcs, as is shown below.

THEOREM 3. Let W be a maximal set of vectors in $V_{n+1}$, $n\geq 3$, over GF(2) with the following properties.
 (a) the sum of two vectors in W is not in W,
 (b) the sum of three distinct vectors in W is not in W.
Then $|W|\geq n+2$, and W corresponds to a maximal skew $|W|$-arc in PG(n, 2). Moreover, any skew w-arc in PG(n, 2) corresponds to a set of w vectors in $V_{n+1}$ satisfying properties (a) and (b).

Proof. Co-ordinatize S=PG(n, 2) over GF(2) as in [3] and consider the set W of vectors provided by the theorem. Because of (a), the corresponding points of S form an arc. Suppose two blocks of S determined by points of K intersect in S\K. Let corresponding distinct vectors be $\bar{a}, \bar{b}, \bar{c}, \bar{d}$ such that $\bar{a}+\bar{b}=\bar{c}+\bar{d}$. Then $\bar{a}+\bar{b}+\bar{c}=\bar{d}\in W$, contradicting (b).

If W were not maximal in PG(n, 2), it would not be maximal in $V_{n+1}$.

Without loss of generality, we may assume that W contains $\{(1, 0, \ldots, 0), (0, 1, 0, \ldots, 0), \ldots (0, \ldots, 0, 1), (1, 1, 1, 0, \ldots, 0)\}$ and hence has order at least n+2.

Now let W be a set of w vectors corresponding to a skew w-arc in PG(n, 2). Since W contains no block of PG(n, 2), W must satisfy (a) above. Suppose some sum of three vectors, say $\bar{a}+\bar{b}+\bar{c}=\bar{d}$, or W is again in W. Then the blocks on $\bar{a}$ and $\bar{b}$ and on $\bar{c}$ and $\bar{d}$ intersect in $\bar{a}+\bar{b}=\bar{c}+\bar{d}$, contradicting the fact that W is skew.

The number n+2 is, in general, far from the best possible bound as we see from lemma 5 and example 5 below.

Lemma 5. Let S be a Steiner triple system on v points with a skew w-arc. Then $w\leq(-1+\sqrt{8v+1})/2$.

Proof. By Theorem 1, $v \geq w(w+1)/2$, from which the above inequality follows.

EXAMPLE 5

We consider skew w-arcs in some of the small projective spaces.

For PG(2, 2,), $w\leq(-1+\sqrt{57})/2$ by lemma 5, and so $w\leq 3$. The points <1, 0, 0>, <0, 1, 0>, <0, 0, 1> form a maximal skew 3-arc.

In PG(3, 2), v=15 and so $w\leq 5$. The construction of Theorem 3 therefore provides a maximal skew 5-arc.

Consider PG(4, 2) with v=31 points. Thus $w\leq 7$. We can get six points using Theorem 3. We show that it is not possible to get a skew 7-arc. Without loss of generality, we may assign the co-ordinates of Theorem 3 to the first six points. A seventh point contains precisely two, three, four or five 1's (i.e. has weight two, three, four or five). Five 1's would contradict condition (a), as would two 1's. Any vector with three 1's is the sum of three vectors with a single 1, contradicting (b). The sum of two weight four vectors is a vector of weight at most two, which is then a sum of vectors of weight one, again contradicting (b).

For PG(5, 2), $w\leq 11$ by lemma 5. We show that 8 is the maximum reachable. Again, we can assign the first seven points as in Theorem 3. Using arguments as in PG(4, 2), it is easy to eliminate as an eighth point, any vector with two, three or six 1's. A vector of weight four different from <1, 1, 1, 1, 0, 0> would have either one 1 or two 1's in the fifth and sixth positions. With only one 1 in these two positions, adding <1, 1, 1, 1, 0, 0> yields a weight two vector, contradicting (b). So only <0, 0, 1, 1, 1, 1> is a possibility. A weight five vector with a zero in the fifth or sixth position can be added to <1, 1, 1, 1, 0, 0> to produce a weight one vector, contradicting (a). We show that no weight five vector can be added to W if <0, 0, 1, 1, 1, 1> is also there: without loss of generality, take <1, 1, 1, 0, 1, 1> as the weight five vector. Then <1, 1, 1, 1, 0, 0>+<0, 0, 1, 1, 1, 1>+<1, 1, 1, 0, 1, 1>=<0, 0, 1, 0, 0, 0>, contradicting (b). Finally, we show that two weight five vectors cannot be added to W as the eighth and ninth points: again, without loss of generality, take <0, 1, 1, 1, 1, 1> and <1, 1, 1, 0, 1, 1>. Then <0, 1, 1, 1, 1, 1>+<1, 1, 1, 0, 1, 1>+<1, 0, 0, 0, 0, 0>=<0, 0, 0, 1, 0, 0>, again contrary to (b). It follows that the maximum possible is eight.

We return to the original message sending scenario. Suppose that A wants to ensure secrecy by enciphering the message. In order to deciper, the receiver only needs to be able to reverse the key that was applied to the critical sets—and of course, needs to be able to locate the portion of the message corresponding to these critical sets!

We may suppose that the message set, and therefore also the critical sets, are public knowledge, while the encryption key and choice of critical set for encryption are not. The larger the number of critical sets per block, the less chance of breaking the message by use of an exhaustive attack. We are thus led to introduce the next definition.

A critical system (P, B, C) is said to be n-critical if each block of B has at least n minimal critical sets. An n-critical system will be denoted $(P, B, C_n)$.

EXAMPLE 6

A projective geometry of order $$q \text{ is } \binom{q+1}{2} - \text{critical}$$

as any two points in a line detemine it uniquely. Any Steiner triple system is 3-critical by the same reasoning. Any t–(v, k, 1) design is $\binom{k}{t}$-critical.

LEMMA 6. If $S_i = (P, B, C_{n_i}^i)$ is an $n_i$-critical system for each $1 \leq i \leq n$, the $\prod_{i=1}^n S_i$ is an $(\prod_{i=1}^n n_i)$-critical system.

Proof. Let $C_i$ be a minimal critical set for a block $B_i$ of $B_i$. The corresponding $(\prod_{i=1}^n v_i)$-vector with 0's in all other positions, is a minimal critical set for any block of $\prod_{i=1}^n S_i$ with $B_i$ in the appropriate position. It follows easily that each block of $\prod_{i=1}^n S_i$ has at least $\prod_{i=1}^n n_i$ minimal critical sets.

LEMMA 7. Let A and B be v×b incidence matrices and define $G_0$ and $G_1$ as in section 3. If A and B are respectively m-critical and n-critical systems, then $G_0$ and $G_1$ are min{m, n}-critical systems.

Proof. Here, a minimal set for a block of $G_0$ or $G_1$ can be identified with a minimal critical set of A or of B. The result follows.

I claim:

1. A method of transmitting information between authorized sites including a transmission site and a receiving site such that the information is secure from non-authorized sites comprising:

providing to the authorized sites a set of messages which can be transmitted between the sites, each message being a string of bits in identifiable positions, and each message being allocated an agreed meaning;

communicating to the authorized sites information identifying for the set of messages selected positions of the bits so that others of the positions of the bits are not selected, the selection of positions being arranged to allow determination of a unique message from the messages set by analysis of the bits in said selected positions;

providing a secret encryption key and a corresponding secret decryption key such that the secret encryption key is known to said transmission site and the corresponding secret decryption key is known to said receiving site;

providing to said transmission site a second encryption key different from said secret encryption key;

selecting at the transmission site from the set of messages a subset of messages to be transmitted;

at the transmission site encrypting for the subset of messages, using said secret encryption key, only the bits at the selected positions;

at the transmission site encrypting for the subset of messages, using said second encryption key, the bits at the not selected positions;

transmitting the encrypted subset of messages from the transmission site;

at the receiving site for each message of the subset decrypting the message using the decryption key to decrypt the bits at said selected positions;

at the receiving site for each message of the subset analyzing the decrypted bits at said positions to determine each message from the set of messages;

and providing a signature of the transmitting site by comparing the encrypted bits at the not selected positions with the bits at the not selected positions from the set of messages.

2. The method according to claim 1 wherein selected bit positions are chosen from a determining set of a matrix of the set of messages.

3. The method according to claim 1 wherein the transmission site transmits insufficient messages using the second encryption key to allow the receiving site to determine the second encryption key and wherein the second encryption key is provided to a trusted authority for subsequent comparison of the signature with the second encryption key to prove the signature of the transmission site.

4. The method according to claim 1 wherein the transmission site transmits sufficient messages using the second encryption key to allow the receiving site to determine the second encryption key and thus to provide said signature.

5. The method according to claim 1 wherein there is a plurality of transmission sites each having its own unique second encryption key and wherein all the second encryption keys are known only to the respective transmission site and to a trusted authority.

6. The method according to claim 1 wherein the second encryption key is not transmitted and hence supplies the system with a high degree of security.

7. The method according to claim 1 wherein the second encryption key is arranged to introduce randomness to the encrypted message.

8. The method according to claim 1 wherein the selected positions provide error detection and correction.

* * * * *